United States Patent
Kambouris

(10) Patent No.: US 9,730,465 B2
(45) Date of Patent: Aug. 15, 2017

(54) PLANT BASED BEVERAGES, AND METHODS FOR PREPARATION THEREOF

(71) Applicant: Gillian Kambouris, Mildura (AU)

(72) Inventor: Bruce Kambouris, Mildura (AU)

(73) Assignee: Gillian Kambouris, Mildura, Victoria (AU)

( * ) Notice: Subject to any disclaimer, the term of this patent is extended or adjusted under 35 U.S.C. 154(b) by 0 days.

(21) Appl. No.: 14/369,366

(22) PCT Filed: Dec. 28, 2012

(86) PCT No.: PCT/AU2012/001605
§ 371 (c)(1),
(2) Date: Jun. 27, 2014

(87) PCT Pub. No.: WO2013/096996
PCT Pub. Date: Jul. 4, 2013

(65) Prior Publication Data
US 2014/0377421 A1 Dec. 25, 2014

(30) Foreign Application Priority Data
Jan. 1, 2012 (AU) ................................ 2012900000

(51) Int. Cl.
| | | |
|---|---|---|
| *A23L 2/74* | (2006.01) | |
| *A23L 2/02* | (2006.01) | |
| *A23L 2/38* | (2006.01) | |
| *A23L 2/52* | (2006.01) | |
| *A23L 2/70* | (2006.01) | |
| *A23L 2/72* | (2006.01) | |
| *A23L 5/20* | (2016.01) | |
| *A23L 33/105* | (2016.01) | |

(52) U.S. Cl.
CPC ........ *A23L 2/02* (2013.01); *A23L 2/38* (2013.01); *A23L 2/52* (2013.01); *A23L 2/70* (2013.01); *A23L 2/72* (2013.01); *A23L 2/74* (2013.01); *A23L 5/20* (2016.08); *A23L 33/105* (2016.08); *A23V 2002/00* (2013.01)

(58) Field of Classification Search
CPC ..... A23L 2/74; A23L 2/02; A23L 2/38; A23L 2/70; A23L 2/72
USPC ........ 426/271, 489, 599, 495; 210/641, 649, 210/650, 651
See application file for complete search history.

(56) References Cited

U.S. PATENT DOCUMENTS

| | | | |
|---|---|---|---|
| 4,643,902 A | | 2/1987 | Lawhon et al. |
| 5,077,075 A | * | 12/1991 | Wade ............................ 426/564 |
| 5,403,604 A | * | 4/1995 | Black, Jr. ................. A23L 2/74 |
| | | | 426/330.5 |
| 6,045,842 A | | 4/2000 | Mozaffar et al. |
| 7,306,735 B2 | * | 12/2007 | Baggott ............... B01D 61/025 |
| | | | 210/205 |
| 8,287,652 B2 | * | 10/2012 | Heikkila ............... B01D 61/027 |
| | | | 127/55 |
| 2003/0026884 A1 | * | 2/2003 | Mantius et al. .............. 426/599 |
| 2004/0234658 A1 | | 11/2004 | Bonnet et al. |
| 2013/0052298 A1 | * | 2/2013 | Wijesinghe ............. A23L 2/085 |
| | | | 426/2 |
| 2013/0193089 A1 | * | 8/2013 | Herberg et al. ............... 210/806 |

FOREIGN PATENT DOCUMENTS

| | | | |
|---|---|---|---|
| WO | 9307766 A1 | | 4/1993 |
| WO | 9824331 A1 | | 6/1998 |
| WO | 2008034180 A1 | | 3/2008 |
| WO | 2008039646 A2 | | 4/2008 |
| WO | 2010083574 A1 | | 7/2010 |
| WO | 2011/113738 | * | 9/2011 |

OTHER PUBLICATIONS

Echavarraia et al.: "Fruit Processing and Membrane Technology Application" Food Engineering Review 2011, vol. 3, pp. 136-158.
International Search Report and Written Opinion dated Feb. 28, 2013 for corresponding International Patent PCTAU2012/001605, filed Dec. 28, 2012.

* cited by examiner

*Primary Examiner* — Helen F Heggestad
(74) *Attorney, Agent, or Firm* — David D. Brush; Westman, Champlin & Koehler, P.A.

(57) ABSTRACT

The present invention provides a method for preparing a plant derived beverage product or process intermediate, the method including the steps of: providing a crushed or liquefied extract of a plant material, exposing the extract to a size exclusion purification means involving membrane filtration (such as nanofiltration, ultrafiltration, reverse osmosis or cross flow filtration) to provide a beverage product or a process intermediate thereof, wherein the purification means is capable of at least partially separating an undesirable component, from a desirable component. The purification methods may be applied to plant materials to selectively remove various components, while leaving others. This allows for the preparation of custom plant extract beverages.

16 Claims, No Drawings

PLANT BASED BEVERAGES, AND METHODS FOR PREPARATION THEREOF

CROSS REFERENCE TO RELATED APPLICATIONS

The present application is a Section 371 National Stage Application of International Application No. PCT/AU2012/001605, filed Dec. 28, 2012, which is incorporated herein by reference in its entirety and published as WO 2013/096996 on Jul. 4, 2013, in English, which claims priority from Australian Provisional Patent Application 2012900000, filed 1 Jan. 2012, which is incorporated herein by reference in its entirety.

FIELD OF THE INVENTION

The present invention relates to beverages prepared from plant material, and in particular fruit and vegetable material.

BACKGROUND TO THE INVENTION

Plant materials are known to provide health benefits when consumed. Fruit and vegetables contain phytonutrients, antioxidants, neutraceutical substances, minerals and vitamins and the like. A number of studies have demonstrated protection against chronic diseases such as heart disease, stroke, cancer and hypertension.

There are numerous types of phytonutrient types found in plant material, including alkaloids, betalains, carotenoids, chlorophyll and chlorophyllin, flavanoids, flavonoligans, Isothiocyanates, monoterpenes, organosulfides, phenolic compounds, sapanins and sterols.

Plant materials also contain water soluble vitamins such as vitamins C, B1, B2, niacin, B6, folate, B12, biotin and pantothenic acid. Water-soluble vitamins are not stored and are readily eliminated in the urine. Humans therefore require a continuous supply in the diet. Water soluble vitamins are available in many plant materials but are easily destroyed as a result of heating, exposure to air, alkaline or acidic conditions and light.

Eight of the water-soluble vitamins are known as the B-complex group: thiamin (vitamin $B_1$), riboflavin (vitamin $B_2$), niacin, vitamin $B_6$, folate, vitamin $B_{12}$, biotin and pantothenic acid. These vitamins are widely distributed in plant material. Their actions are exerted in many parts of the body, functioning as coenzymes involved in the extraction of energy from food. They also are important for appetite, vision, skin, nervous system and red blood cell formation.

Vitamin C assists in maintaining cell integrity, aids in wound healing, bone and tooth formation, strengthens the blood vessel walls, is vital for the function of the immune system, and improves absorption and utilization of iron. This vitamin also helps prevent nutritional ailments such as scurvy. Vitamin C also serves as an antioxidant, working with vitamin E as a free-radical scavenger. Studies suggest that vitamin C may reduce the risk of certain cancers, heart disease and cataracts. Vitamin C is not manufactured by the body, but must be constantly consumed. While the body has a constant need for vitamin C, it has a limited storage capacity.

From the above, it is clear that plant-based beverages are beneficial to health. However, there are negative health consequences associated with the consumption of fruit or vegetable beverages. For example, the total sugar content (glucose, fructose and sucrose) in such beverages elicits a rapid insulin or glycaemic response proportional to the sugar load. For optimum health, it is recommended that carbohydrate consumption should be predominantly from low GI foods. Beverages such as those derived from oranges and pineapples contain high amounts of simple sugars and therefore exhibit relatively high glycaemic indices.

Common medical conditions such as diabetes and metabolic syndrome, are sugar sensitive, and are managed through minimal sugar intake through selection of foods on the basis of their sugar content. Furthermore, consumption of high or moderate GI plant material including their juices have been linked to weight gain and obesity as a result of calorie contribution of the sugar.

While beneficial to health, the consumption of fruits and vegetables can be inconvenient, or even problematic. For example, in solid form fruits and vegetables can be difficult or inconvenient, especially for children. Vegetables may be cooked to facilitate consumption; however this can destroy heat labile vitamins.

Both fruits and vegetables can be crushed or liquefied to form a beverage which is easily consumed. However problems exist in that, for example, suspended solids can make the beverage appear cloudy and provide for negative organoleptic and aesthetic properties. Furthermore, vegetable and fruit juices can be aesthetically unpleasing. During storage the various components can settle. Also during storage, some components can oxidise to provide alteration undesirable alterations to colouration, taste and aroma.

It is an aspect of the present invention to overcome or ameliorate a problem in the prior art to provide plant-based beverages having improved characteristics, or alternative characteristics to those known in the art.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of each claim of this application.

SUMARY OF THE INVENTION

In a first aspect the present invention provides a method for preparing a plant derived beverage product or process intermediate, the method including the steps of: providing a crushed or liquified extract of a plant material, exposing the extract to a purification means to provide a beverage product or a process intermediate thereof, wherein the purification means is capable of at least partially separating an undesirable component, from a desirable component.

The undesirable component may be a sugar, a protein, a tannin, a phenolic, an aromatic molecule, a molecule contributing to taste, an acid, a particulate or an oil. The desirable component may be a mineral, a vitamin, water, an antioxidant, a phytonutrient, a phytochemical, an aromatic molecule, or a molecule contributing to taste.

The purification means may be a size exclusion purification including nanofiltration, reverse osmosis, ultrafiltration, cross-flow filtration, or Liqui-cel membrane contactors. Preferably the size exclusion purification means is nanofiltration.

The size exclusion purification means may have a nominal molecular weight cut-off of greater than about 90 Daltons, or greater than about 100 Daltons.

Some embodiments of the method comprising a second size exclusion purification means which may have a nominal molecular weight cut-off greater than about 180 Daltons.

The method may further comprising the step of exposing the product or process intermediate to an activated carbon or zeolite, or to Amberchrom CG-161 resin or functionally equivalent resin.

Another embodiment of the invention provides that the liquefied extract of a plant material is a by-product of a plant juice concentration process such as a filtration permeate, or a low sugar juice produced by evaporation or freezing.

In another aspect the present invention provides a plant-derived beverage product or process intermediate thereof produced by a method as described herein. The plant beverage product or process intermediate thereof may have any one or more of the following characteristics:

(a) Aroma/odour constituents of more than odour #3A and/or over the threshold odour acceptable for drinking water;

(b) Apparent colour or absorbance of more than the sum of the spectrophotometric absorbance at 420 nm and 520 nm of laboratory grade reverse osmosis water when measured through a quartz cuvette having a pathlength of 1 cm;

(c) More than about 0.1 Bx sugar, or more than about 0.005 Bx sugar; and/or less than the amount of sugar in an untreated juice.

(d) Noticeable taste over and above that of comparable to potable drinking water (e) More than about 50 ppm total dissolved solids (TDS);

(f) More than about 600 ppm total organic carbon (TOC); and (g) Turbidity more than about 0.5, preferably more than about 0.5 NTU.

DETAILED DESCRIPTION OF THE INVENTION

After considering this description it will be apparent to one skilled in the art how the invention is implemented in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention. Furthermore, statements of advantages or other aspects apply to specific exemplary embodiments, and not necessarily to all embodiments covered by the claims.

Unless the contrary intention is expressed, the features presented as preferred or alternative forms of the invention can be present in any of the inventions disclosed as alone or in any combination with each other.

Throughout the description and the claims of this specification the word "comprise" and variations of the word, such as "comprising" and "comprises" is not intended to exclude other additives, components, integers or steps.

In a first aspect the present invention provides a method for preparing a plant derived beverage product or process intermediate, the method including the steps of: providing a crushed or liquefied extract of a plant material, exposing the extract to a purification means to provide a beverage product or a process intermediate thereof, wherein the purification means is capable of at least partially separating an undesirable component, from a desirable component.

Applicant proposes that purification methods may be applied to plant materials to selectively remove various components, while leaving others. This allows for the preparation of custom plant extract beverages.

As used herein, the term "beverage product" is intended to include any drink suitable for animal consumption, including substantially pure water products.

As will be understood, the definition of a desirable component and an undesirable component depends on one or more characteristics of the beverage product under consideration. For example, where the beverage product is intended to have a reduced level of sugar, but to retain components beneficial to health, glucose and fructose are undesirable components while vitamin B is a desirable component. It will be apparent, that depending on the desired beverage product, a given molecule may be desirable and undesirable.

In certain embodiments of the invention, the undesirable component is selected from the group consisting of a sugar (including glucose or fructose or sucrose), a protein, a tannin, a phenolic, an aromatic molecule, a molecule contributing to taste or aroma, an acid, a particulate and an oil.

In certain embodiments of the invention, the desirable component is selected from the group consisting of a mineral, a vitamin, water, an antioxidant, a phytonutrient, a phytochemical, an aromatic molecule, and a molecule contributing to taste.

Certain embodiments of the present invention is distinguished from methods of the prior art including those described in Australian Patent No 2010101445, that provide beverages derived from fruit that are very close to pure water. These prior art beverages are virtually devoid of taste, aroma, sugars, vitamins containing only trace amounts of plant-derived material.

By contrast, the beverages products produced according to the current methods exhibit controlled levels of various plant-derived components such as minerals, vitamins, sugar, colour, taste, aroma, phytonutrients and the like. The present beverages are pleasant to consume and retain many of the health benefits of a basic fruit or vegetable juice.

In one embodiment of the method the purification means is a size exclusion purification means. Applicant proposes that it is possible to produce customized plant-based beverages that can be accurately controlled in terms of composition using size-based methods. This is distinct from the prior art usage of size-exclusion methods which have previously been used only with the intention of removing as many components as possible, and also removing those components to a maximal level.

The size exclusion purification means is preferably selected from the group consisting of nanofiltration, reverse osmosis, ultrafiltration, cross-flow filtration and Liqui-cel membrane contactors .

Preferably, the size exclusion means is nanofiltration. While "dead end" nanofiltration techniques may be operable in some applications, a cross-flow (also known as tangential flow) technique is preferred. Nanofiltration is a pressure driven process for separating larger size solutes from aqueous solutions by means of a semi-permeable membrane. It is typically a low to moderately high pressure (about 50-450 psig) process in which monovalent ions pass freely through the membrane but highly charged, multivalent salts and low molecular weight organics will be rejected to a much greater degree.

Without wishing to be limited by theory, crossflow membrane filtration controls the effect of concentration polarization and the gel layer. It provides the most rapid, and hence economic, continuous membrane filtration. The process is carried out by having a process solution flow along a membrane surface under pressure. Crossflow membrane filtration uses a high cross flow rate to enhance permeate passage and reduce membrane fouling. Retained solutes (such as dissolved salts) leave with the flowing process stream and do not accumulate on the membrane surface.

Liquified plant materials could quickly foul a membrane leading to a process which is uneconomical, or even technically impossible.

The goal in selecting a membrane is to optimize (for the particular application) the molecular weight cutoff (MWCO), membrane composition, permeability, and rejection characteristics, that is, the membrane's total capacity to retain specific molecules while allowing salts and other, generally smaller or opposite charged molecules, to pass through. The percent retention of a component i (Ri) is given by the formula $R_i=(1-C_{ip}/C_{ir})\times 100\%$, wherein $C_{ip}$ is the concentration of component i in the permeate and $C_{ir}$ is the concentration of component i in the retentate, both expressed in weight percent. The percent retention of a component is also called the retention characteristic or the membrane rejection coefficient. Membranes will have both a retentate (substances that do not pass through) and permeate (substances that do pass through).

For effective separation, a membrane is chosen that has a high rejection ratio for the constituent of interest relative to the rejection ratio for compounds from which separation is desired. If a membrane has a high rejection ratio for a first compound relative to a second compound, the concentration of the first compound in the permeate solution which passes through the membrane is decreased relative to that of the second compound. Conversely, the concentration of the first compound increases relative to the concentration of the second compound in the retentate. If a membrane does not reject a compound, the concentration of the compound in both the permeate and the reject portions will remain essentially the same as in the feed solution. It is also possible for a membrane to have a negative rejection rate for a compound if the compound's concentration in the permeate becomes greater than the compound's concentration in the feed solution. A general review of membrane technology is found in "Membranes and Membrane Separation Processes," in Ullmann's Encyclopedia of Industrial Chemistry (VCH, 1990); see also, Noble and Stern, Membrane Separations Technology: Principles and Applications (Elsevier, 1995). See also "The Filtration Spectrum", Osmonics, Inc., Minnetonka, Minn., 1990 and 1984 editions.

As a starting point, a membrane is chosen having a molecular weight cut-off (MWCO, which is often related to membrane pore size) that is expected to retain the desired compounds while allowing an undesired compound present in the feed stream to pass through the membrane. The desired MWCO is generally less than the molecular weight of the compound being purified, and is typically greater than the molecular weight of the undesired contaminant that is to be removed from the solution containing the compound being purified. For example, to purify a compound having a molecular weight of 200 Daltons, a membrane is chosen having a MWCO of less than about 200 Daltons. A membrane with a MWCO of about 100 Daltons, for example, would also be a suitable candidate. The membranes that find use in the present invention are classified in part on the basis of their MWCO as ultrafiltration (UF) membranes, nanofiltration (NF) membranes, or reverse osmosis (RO) membranes, depending on the desired separation. For purposes of this invention, UF, NF, and RO membranes are classified as defined in the Pure Water Handbook, Osmonics, Inc. (Minnetonka Minn.). RO membranes typically have a nominal MWCO of less than about 200 Daltons and reject most ions, NF membranes generally have a nominal MWCO of between about 150 Daltons and about 5 kDa, and UF membranes generally have a nominal MWCO of between about 1 kDa and about 300 kDa.

Throughout this specification, the term "about" is used in connection with values such as molecular weight cut off and pore size. As the skilled person appreciates, the molecular weight values attributed to filters may depend on the means for measuring pore size or molecular weight cutoff, or even the filter manufacturer and the values may not be cited absolutely. The skilled person will be capable of determining an appropriate filer given the technical starting point for molecular weight or pore size provided herein, having in mind the aim of the filtration step. Variability of 1%, 2%, 3%, 4%, 5%, 6%, 7%, 7%, 9%, or 10% from the cited values may be applied.

A second parameter that is considered in choosing an appropriate membrane for a particular separation is the polymer type of the membrane. The membranes used in each zone are made of conventional membrane material whether inorganic, organic, or mixed inorganic and organic. Typical inorganic materials include glasses, ceramics, cermets, metals and the like. Ceramic membranes are preferred for the UF zone. The organic materials which are preferred for the NF and RO zones are typically polymers, whether isotropic, or anisotropic with a thin layer or "skin" on either the bore side or the shell side of the fibers. Preferred materials for fibers are polyamides, polybenzamides, polysulfones (including sulfonated polysulfone and sulfonated polyether sulfone, among others), polystyrenes, including styrene-containing copolymers such as acrylo-nitrile-styrene, butadiene-styrene and styrene-vinylbenzylhalide copolymers, polycarbonates, cellulosic polymers including cellulose acetate, polypropylene, poly(vinyl chloride), poly(ethylene terephthalate), polyvinyl alcohol, fluorocarbons, and the like. The NF and RO membranes often consist of a porous support substrate in addition to the polymeric discrimination layer.

Of particular importance in selecting a suitable membrane composition is the membrane surface charge. Within the required MWCO range, a membrane is selected that has a surface charge that is appropriate for the ionic charge of the constituent and that of the contaminants. While MWCO for a particular membrane is generally invariable, changing the pH of the feed solution can affect separation properties of a membrane by altering the membrane surface charge. For example, a membrane that has a net negative surface charge at neutral pH can be adjusted to have a net neutral charge simply by lowering the pH of the solution. An additional effect of adjusting solution pH is to modulate the ionic charge on the contaminants and on the constituent of interest. Therefore, by choosing a suitable membrane polymer type and pH, a system can be obtained in which both the contaminant and the membrane are neutral, facilitating pass-through of the contaminant. If, for instance, a contaminant is negatively charged at neutral pH, it is often desirable to lower the pH of the feed solution to protonate the contaminant. Of course, the manufacturer's instructions must be followed as to acceptable pH range for a particular membrane to avoid damage to the membrane.

Generally, separation of proteins, oils and other particulates from other soluble constituents will employ membranes that are commonly referred to as ultrafiltration (UF) membranes. UF membranes that are suitable for use in the methods of the invention are available from several commercial manufacturers, including Millipore Corp. (Bedford, Mass.), Osmonics, Inc. (Minnetonka, Minn.), Filmtec (Minneapolis, Minn., UOP, Desalination Systems, Advanced Membrane Technologies), and Nitto.

Nanofiltration membranes are a class of membranes for which separation is based both on molecular weight and ionic charge. These membranes typically fall between reverse osmosis and ultrafiltration membranes in terms of the size of species that will pass through the membrane. Nanofiltration membranes typically have micropores or openings between chains in a swollen polymer network. Molecular weight cut-offs for non-ionized molecules are typically in the range from about 100-20,000 Daltons. For ions of the same molecular weight, membrane rejections (retentions) will increase progressively for ionic charges of 0, 1, 2, 3 etc. for a particular membrane because of increasing charge density (see, e.g., Eriksson, P., "Nanofiltration Extends the Range of Membrane Filtration," Environmental Progress, 7: 58-59 (1988)). Nanofiltration is also described in Chemical Engineering Progress, pp. 68-74 (March 1994), Rautenbach et al., Desalination 77:73 (1990). See also "The Filtration Spectrum", Osmonics, Inc., Minnetonka, Minn., 1990 and 1984 editions.

In a typical application, sugars of interest will be retained by the nanofiltration membrane and contaminating salts and other undesired components will pass through. A nanofiltration membrane useful in the methods of the invention will typically have a retention characteristic for the sugar of interest of from about 40% to about 100%, preferably from about 70% to about 100%. The nanofilter membranes used in the invention can be any one of the conventional nanofilter membranes, with polyamide membranes being particularly suitable. Several commercial manufacturers, including Millipore Corp. (Bedford, Mass.), Osmonics, Inc. (Minnetonka, Minn.), Filmtec, UOP, Advanced Membrane Technologies, Desalination Systems, and Nitto, among others, distribute nanofiltration membranes that are suitable for use in the methods of the invention. For example, suitable membranes include the Osmonics MX07, YK, GH (G-10), GE (G-5), and HL membranes, among others.

Reverse osmosis (RO) membranes also allow a variety of aqueous solutes to pass through them while retaining selected molecules. Generally, osmosis refers to a process whereby a pure liquid (usually water) passes through a semi permeable membrane into a solution (usually sugar or salt and water) to dilute the solution and achieve osmotic equilibrium between the two liquids. In contrast, reverse osmosis is a pressure driven membrane process wherein the application of external pressure to the membrane system results in a reverse flux with the water molecules passing from a saline or sugar solution compartment into the pure water compartment of the membrane system. A RO membrane, which is semi permeable and non-porous, requires an aqueous feed to be pumped to it at a pressure above the osmotic pressure of the substances dissolved in the water. An RO membrane can effectively remove low molecular weight molecules (about <200 Daltons) and also ions from water. Preferably, the reverse osmosis membrane will have a retention characteristic for the constituent of interest of from about 40% to about 100%, preferably from about 70% to about 100%. Suitable RO membranes include, but are not limited to, the Filmtec BW-30, Filmtec SW-30, Filmtec SW-30HR, UOP RO membranes, Desal RO membranes, Osmonics RO membranes, Advanced Membrane Technologies RO membranes, and the Nitto RO membranes, among others. One example of a suitable RO membrane is Millipore Cat. No. CDRN500 60 (Millipore Corp., Bedford, Mass.).

The membranes used in the present methods may be employed in any of the known membrane constructions. For example, the membranes can be flat, plate and frame, tubular, spiral wound, hollow fiber, and the like. In a preferred embodiment, the membrane is spiral wound. The membranes can be employed in any suitable configuration, including either a cross-flow or a depth configuration. In "cross-flow" filtration, which is preferred for ultrafiltration, nanofiltration and reverse osmosis purifications according to the invention, the "feed" or solution from which the constituent of interest is to be purified flows through membrane channels, either parallel or tangential to the membrane surface, and is separated into a retentate (also called recycle or concentrate) stream and a permeate stream. To maintain an efficient membrane, the feed stream should flow, at a sufficiently high velocity, parallel to the membrane surface to create shear forces and/or turbulence to sweep away accumulating particles rejected by the membrane. Cross-flow filtration thus entails the flow of three streams—feed, permeate and retentate. In contrast, a "dead end" or "depth" filter has only two streams—feed and filtrate (or permeate). The recycle or retentate stream, which retains all the particles and large molecules rejected by the membrane, can be entirely recycled to the membrane module in which the recycle stream is generated, or can be partially removed from the system. When the methods of the invention are used to purify sugars from lower molecular weight components, for example, the desired sugars are contained in the retentate stream (or feed stream, for a depth filter), while the permeate stream contains the removed contaminants.

The purification methods of the invention can be further optimized by adjusting the pressure, flow rate, and temperature at which the filtration is carried out. UF, NF, and RO generally require increasing pressures above ambient to overcome the osmotic pressure of the solution being passed through the membrane. The membrane manufacturers' instructions as to maximum and recommended operating pressures can be followed, with further optimization possible by making incremental adjustments. For example, the recommended pressure for UF will generally be between about 25 and about 100 psi, for NF between about 50 psi and about 1500 psi, and for RO between about 100 and about 1500 psi. Flow rates of both the concentrate (feed solution) and the permeate can also be adjusted to optimize the desired purification. Again, the manufacturers' recommendations for a particular membrane serve as a starting point from which to begin the optimization process by making incremental adjustments.

The membranes can be readily cleaned either after use or after the permeability of the membrane diminishes. Cleaning can be effected at a slightly elevated temperature if so desired, by rinsing with water or a caustic solution. If the streams contain small amounts of enzyme, rinsing in the presence of small amounts of surfactant, for instance ULTRASIL®, might be useful. Also, prefilters (100-200 µm) can be used to protect the more expensive nanofiltration membranes. Other cleaning agents can, if desired, be used. The choice of cleaning method will depend on the membrane being cleaned, and the membrane manufacturer's instructions should be consulted. The cleaning can be accomplished with a forward flushing or a backward flushing.

In the present invention, juice is obtained from any fruit, vegetable, sugar cane or coconut where it is desired to have a drinking water or a plant derived beverage produced.

The fruit juice can be processed directly after extraction from the fruit or preferably is a finished juice which has been preliminarily filtered to remove seeds, pulp and miscellaneous solids. Alternatively, the juice can be allowed to settle naturally into a solid and liquid fraction (referred to herein as "juice plasma"). This liquid fraction is removed from the solids by aspiration, decanting or other methods. Solids and juice plasma can be separated by course filtration (sand filters) or centrifugation. Separation of juice into solids and juice plasma can be accelerated either by acidification or the use of unpasteurized juice. Use of a finished fruit juice will allow for a more efficient UF process because the filters will not clog as quickly. If clogging is an issue, juice solids will need to be reduced through any one of a number of traditional ways such as centrifugation, flotation or other.

In practicing the present invention, a clarified juice or juice plasma is passed through a UF membrane. The filtration membranes employed in the practice of the present invention for treating orange juice are standard filtration units well known to one skilled in the art. The membrane can be of any standard composition such as a polysulfone, a fluoropolymer, cellulose acetate or the like.

The UF membranes may have a pore size of between 30 and 1,000 Angstroms ($1\mu$) which corresponds to a molecular weight cut off (MWCO) range of about 2000 Daltons to about 100,000 Daltons. It is selected on the basis that it can retain the "cloudy" components, pulp, oil, soluble flavours and oil soluble colours. It will permeate most of the water, sugars (glucose, fructose, sucrose, raffinose and stachyose), citric acid, ascorbic acid, water soluble vitamins, minerals, water soluble components (phytonutrients, antioxidants, neutraceuticles, minerals), peel compounds and volatile aromatic and flavour components.

The UF permeate is collected and passed through a NF membrane with a MWCO of about 200 Daltons in size, selected to allow glucose and fructose (MW about 180 Daltons) to pass through with minimal retention. This filtration step also allows minerals, volatile aromatic and flavour constituents, citric acid, ascorbic acid to pass with the water as permeate.

This filtration step results in a concentrate of the UF permeate fraction that is rich in citric acid, ascorbic acid, water soluble vitamins, water soluble components (phytonutrients, antioxidants, neutraceuticals, and minerals), peel compounds and some other residual sugars.

The UF permeate is optionally treated to remove bitter peel and brown components such as, for example, contacting the UF permeate with a polymeric adsorption resin. Commercial adsorption resins useful for this purpose include styrene divinylbenzene resins and are available from The Dow Chemical Company, Midland, Mich., and Rohm and Haas Co., Philadelphia, Pa.

Glucose and fructose in the NF permeate can be concentrated by removing most of the water, minerals, ascorbic acid and volatile aromatic and flavour compounds using further filtration. Since MWCO of NF and RO membranes often overlap, either membrane can be used for this step. The MWCO could be any size, but is preferably less than that of the glucose and fructose (MW about 180 Daltons), to retain these sugars from entering the permeate. Reference is made to "The Filtration Spectrum", Osmonics, Inc., Minnetonka, Minn., 1990 and 1984 editions.

This final water permeate containing volatile aromatic or flavour compounds, minerals and ascorbic acid (vitamin C) with only traces of sugar can be used directly as the water fraction to add UF concentrate or the final RO or NF retentate containing concentrated containing glucose and fructose to produce beverages of variable composition.

It is within the scope of the invention that such multiple filtration steps are carried out in series in real time or, individually at different times. Furthermore, in one embodiment of the method the RO/NF permeate (which is predominantly water), is added to a prior filtration step. An advantage of this embodiment is noted where the permeate is placed with the NF retentate, it will act to increase the volume and efficiency of removing the sugar into the permeate.

This final permeate containing at least water, ascorbic acid, volatile aromatic or flavour compounds can also be further processed by an activated carbon or biologically activated step to produce drinking water containing minerals, other plant components and at most, only traces of sugar, making is suitable for bottling after sterile filtration. Alternatively, this same final permeate rich in water can be used to produce a beverage by adding variable amounts of UF permeate concentrate (high in nutrients and acids), or the final RO or NF retentate (high in glucose and fructose), or UF retentate. This new beverage mixture can have any amounts of either the nutrient rich UF permeate, RO/NF sugar retentate and RO/NF permeate to produce variations to taste, nutrient and sugar (calorie) status of the beverage.

The temperature at which the present separation processes are conducted is not critical. However, temperatures between 15° C. and 37° C. are preferred.

It is also preferred to use low solids or juice plasma and pectin clarified juice processed under an inert gas atmosphere at the natural pH of the juice, and in low light exposure to reduce nutritional oxidation and decay. Concentrate sterilisation is preferable carried out by either high pressure sterilisation, UV sterilization or the use of Dimethyl Dicarbonate (DMDC) or other methods that preserve the activity of the nutrient constituents.

In an embodiment of the method the size exclusion purification means has a nominal molecular weight cut-off is greater than about 90 Daltons.

In another embodiment the size exclusion purification means has a nominal molecular weight cut-off greater than about 100, 110, 120, 130, 140, 150, 160, 170, 180, 190, 200, 300 or 400 Daltons.

In yet a further embodiment of the method the size exclusion purification means has a nominal molecular weight cut-off greater than about 500 Daltons.

In certain embodiments, the size exclusion purification means has a nominal molecular weight cut-off of less than about 1500 Daltons.

Some forms of the method comprise a second size exclusion purification means. In an embodiment of the method the second size exclusion purification means has a nominal molecular weight cut-off greater than about 90 Daltons.

In another embodiment the second size exclusion purification means has a nominal molecular weight cut-off greater than about 100, 110, 120, 130, 140, 150, 160, 170, 180, 190, 200, 300 or 400 Daltons.

In yet a further embodiment of the method the second size exclusion purification means has a nominal molecular weight cut-off greater than about 500 Daltons.

In certain embodiments, the second size exclusion purification means has a nominal molecular weight cut-off of less than about 2000 Daltons.

It is contemplated that a third, fourth, fifth, sixth or more subsequent size exclusion purification means may be incorporated into the present methods.

In preferred forms of the method the liquefied extract of a plant material is a by-product of a plant juice concentration process. Thus, the present methods are useful in converting a by-product into a useful and potentially vendible beverage product. The by-product may be the result of any concentration process currently used in juice processing, including filtration, evaporation, and freezing.

In one embodiment, the liquefied extract of a plant material is a filtration permeate, or a low sugar juice optionally produced by evaporation or freezing.

The following illustrates how concentrate by-product stream can be made into a beverage including drinking water. The exemplary steps are as follows:
1. remove pulp, pips, microbes, skin and other solids by filtration through a membrane that is not larger than 0.45 microns in pore size, and preferably 0.22 microns pore size. Preferably, this filtration is a cross flow filtration unit, optionally having a pore size of 0.2 microns diameter.
2. Process the concentration by-product waste stream through a nanofiltration membrane at a molecular cut off about 1500 Daltons chosen to allow desirable minerals, vitamin, glucose, fructose and other sugar component(s) to pass with water as the permeate. When the concentration by product has very low levels of residual glucose and fructose as a result of efficient filtration or evaporation concentration of plant juices, the sugar in the permeate is very low and is desirable in the product.

The permeate formed from steps 1 and 2 may be further polished with activated or biologically activated carbon and zeolite or AmberChrom CG-161 to remove aroma and sugar to make the water more neutral in aroma and taste.

Alternatively, the vitamins and minerals can be removed from the glucose and fructose components by further filtration through a NF filtration membrane with 200 Dalton MW cut off. This arrangement essentially allows water, sugars and most cationic minerals to permeate through the membrane. Vitamins such as Vitamin A (MW 333), D (MW 384), E (MW 430.71), K (MW 450.70), B1 (MW 300.84), B6 (MW 205.64) and B12 (MW 1355.4) are retained from entering the permeate, and remain as the retentate.

A further optional filtration step of less than about 180 Daltons MWCO applied to the permeate separates the glucose and fructose from the water, minerals and low molecular weight aromatic and flavour compounds to produce drinking water. This product may also require polishing as described above to neutralise the aroma and taste of the water beverage before sterilization and bottling. This final water permeate can also be back blended with the 200 to 1500 Dalton MWCO fraction containing vitamins etc prior to the polishing step outlined above to produce a vitamin water. It is preferred that all measures that protect vitamin stability be taken during processing i.e. reduced air, light and heat etc. This effectively produces a cleaner fraction than the original by-product.

Alternatively, this concentration by-product waste stream can be passed through either an RO or NF membrane greater than about 90 or 100 Daltons MWCO membrane or specifically a membrane with a MWCO of which is less than about 180 Daltons and suitable in removing most glucose and fructose. The permeate of this filtration step will contain minerals, low molecular weight aromatic and flavour components and ascorbic acid if present in the original by-product waste stream.

As exemplified above, in certain embodiments the method comprises the step of exposing the product or process intermediate to activated carbon, preferably either powdered or granular activated carbon (GAC). The activated carbon may be a biologically activated carbon (BAC). BACs have a microbial population that consumes and survives on the organic constituents that bind to the activated carbon, effectively regenerating the filtration media as it is used. The leakage of microbial activity from the BAC into the final product can be inactivated by UV light or removed by 0.22 micron filtration.

Another polishing step is exposure of the product or process intermediate to a mineral such as a zeolite. Zeolites are aluminosilicate members of the family of microporous solids, with more common members being analcime, chabazite, clinoptilolite, heulandite, natrolite, phillipsite, and stilbite. Such natural or man made zeolites can be used to capture and remove molecules on the basis of having pore size greater than the molecular diameter of the molecule to be removed and furthermore, be suitably either hydrophobiic or hydrophilic. An example mineral formula is: $Na_2Al_2Si_3O_{10}.2H_2O$, the formula for natrolite.

Another polishing step can include the use of Amberchrom CG-161 to further process the filtration permeate. The Amberchrom resin may be incorporated for the purpose of reducing residual sugar levels to reduce the residual sugar. Detailed application notes for the Amberchrom CG-161 resin may be obtained from Rohn and Haas Company, Philadelphia USA. Functionally equivalent resins are also included within the scope of the present methods.

The so-called "polishing" steps are typically placed at or toward the end of a purification process and aims in some embodiments to remove residual low molecular weight aromatic and flavour constituents derived from the source plant material.

As mentioned supra, the method may comprise the step of exposing the beverage product or process intermediate to a second or third size exclusion purification means, the second size exclusion purification means having lower and a different molecular weight cut-off to the first size exclusion purification means. The third size exclusion means having a molecular weight of between about 90 and less than about 180 Daltons to exclude sugar. This approach allows for the selection of components within a defined molecular weight "band", providing for a high level of customization of the beverage product.

For example, the method may comprise a purification means having a nominal cut-off of >about 1500 Daltons in combination with a purification means having a molecular weight cut-off of about 200 Daltons. The third size exclusion means having a MWCO of between 90 and less than about 180 Daltons to exclude sugar. The third size exclusion means may have a molecular weight of 90, 100, 110, 120, 130, 140, 150, 160, 170, 180 or 190 Da. This approach provides three permeate bands. One band will have components with a MWCO greater than about 200 and less than about 1500 Daltons (to provide a "nutrient fraction"). The second band will have components with a MWCO components between about 90 and about 200 Daltons (to provide a "glucose and fructose fraction") and the third band will have components of MWCO between about 90 and less than about 180 Daltons (referred to as a "water fraction"). Re-blending the first and third filtration bands produces a novel beverage of juice which has thereby excluded the undesirable components such as glucose and fructose but maintaining the the majority of the non-sugar mineral components. The provision of a reduced-sugar fruit juice is a substantial contribution to the art, given the adverse health effects of consuming the large amounts of simple sugars in unmodified fruit and vegetable juices.

The present methods may comprise other treatment methods such as pasteurization, addition of preservatives, addition of nutritional supplements and the like.

In some embodiments, the method comprises the step of retaining a by-product of a size-exclusion purification process and recombining a fraction of that by-product with the process product. For example, a size-exclusion purification step may remove fructose and glucose.

The plant-based starting material for the present methods can be a mechanically prepared juice or crush of a plant. Alternatively, the starting material may be a process intermediate of a separate process. For example, the liquid fraction that remains after fruit or vegetable or sugar cane juices have been concentrated commercially is referred to as LSJ (low sugar juice). The processes that produce concentrate and hence LSJ are several including evaporation, filtration (Reverse Osmosis) and freeze concentration.

It will be appreciated that in many circumstances, some pre-treatment of the plant material will be required. Otherwise blockage occurs. For example, processes such as cross-flow filtration or ultrafiltration will be useful. Accordingly, in some embodiments the method comprises the step of pre-treatment.

It will be appreciated that based on the present disclosure, the skilled person could prepare beverages from one (or even a mixture) of the following plants: fruits including orange, apple, tomato, grape, pineapple, mango, berries; coconut milk; sugar cane and the like; vegetables including carrot, celery, beet, pumpkin, and turnip and the like.

In a second aspect the present invention further provides a plant-derived beverage product or process intermediate thereof produced according to a method described herein.

In one embodiment, the product of the present methods has any one or more of the following characteristics:
  Aroma/odour constituents of more than odour #3A and/or over the threshold odour acceptable for drinking water;
  Apparent colour or absorbance of more than the sum of the spectrophotometric absorbance at 420 nm and 520 nm of laboratory grade reverse osmosis water when measured through a quartz cuvette having a pathlength of 1 cm;
  More than about 0.1 Bx sugar, or more than about 0.005 Bx sugar; and/or less than the amount of sugar in an untreated juice.
  Noticeable taste over and above that of comparable to potable drinking water
  More than about 50 ppm total dissolved solids (TDS);
  More than about 600 ppm total organic carbon (TOC); and
  Turbidity more than about 0.5, preferably more than about 0.5 NTU.

In another embodiment, the product of the present methods is very similar to pure water and has any one or more of the following characteristics:
  Aroma/odour constituents of less than odour #3A and/or under the threshold odour acceptable for drinking water;
  Apparent colour or absorbance of more than the sum of the spectrophotometric absorbance at 420 nm and 520 nm of laboratory grade reverse osmosis water when measured through a quartz cuvette having a pathlength of 1 cm;
  Less than about 0.1 Bx sugar, or less than about 0.005 Bx sugar; and/or less than the amount of sugar in an untreated juice.
  No noticeable taste over and above that of comparable to potable drinking water
  Less than about 50 ppm total dissolved solids (TDS);
  Less than about 600 ppm total organic carbon (TOC); and
  Turbidity less than about 0.5, preferably less than about 0.5 NTU.

Preferably, the beverage defined above is produced from filter concentrated low sugar juice residues. The low sugar juice may be provided by evaporation, filtration or freeze concentrating. In one embodiment, the process used to produce this embodiment comprises the steps of filtration between about >100 and about <180 Daltons to produce a sugar free water.

The present invention will now be more fully described by reference to the following non-limiting Examples.

EXAMPLES

Example 1

Production of Juice Plasma from Orange Juice

Freshly squeezed orange juice simply contains solids that are suspended in serum or plasma. In combination, the juice is given its colour and taste. Routinely, however, it is common to reduce the amount of solids the juice has for the purpose of preparing the juice for bottling and consistency. Despite reducing solids, the juice appears like normal orange juice. Such orange juice, despite its lower solid percentage cannot be sterilized by filtration through 0.45 or 0.22 micron in size and requires other forms of treatment.

This invention proposes that the freshly squeezed orange juice can be separated into a clear, almost colourless liquid (plasma or serum) and a solid deposit. Such juice plasma aspirated or decanted from the solids can then be filtered particularly through 0.45 micron filtration in order to reduce the solids further and reduce the risk of infection.

The process of reducing solids in the final juice to less than 0.45 microns can be optimised further than using gravity alone by either;
1. Acidifying the juice, particularly if the juice is greater than ph=4.6 (i.e. carrot juice) to improve the separation of solids from the plasma.
2. High speed centrifugation or decanting to improve the separation of solids from the plasma.

This settled plasma can further be reduced in solid content by passing it through 0.22 to 0.45 micron filtration i.e. cross flow ultrafiltration.

The resultant orange juice plasma has many of the nutrients of the original juice without solids that will precipitate. Importantly, this plasma is filter sterilized and will not require pasteurization. If required, the plasma can be decolourised and or deodorized using activated carbon that had been pre-treated with nitrogen gas to remove the attached oxygen that could oxidize the plasma.

Example 2

Production of Low Sugar Orange Juice

Fresh orange juice can be fractionated to remove predominantly the glucose and fructose. To do this, the solids in the raw fresh juice need to be reduced. This can be done by allowing the juice to settle (example 1 above) or the juice to be processed through mechanical separators such as a centrifuge or decanter (Westfalia separators). The solids are kept for later reconstruction of the fractionated juice.

Low solid juice or neat juice or juice plasma can be filtered by ultrafiltration with a membrane of about 2000 Daltons (Koch membrane Polyethersolfone). This will reject any "cloudy" components, remaining pulp, oil, soluble flavours and oil soluble flavours from this permeate. This fraction is characterized as containing constituents that have a molecular size greater than 2000 Daltons (fraction 1)

The permeate will contain water, sugars such as glucose and fructose, citric acid, ascorbic acid, water soluble vitamins, minerals, phytonutrients, antioxidants, peel compounds and flavour components etc. This fraction is characterized as containing constituents that have a molecular size less than 2000 Daltons (fraction 2).

Fraction 2 can be further filtered using NF (Perma spiral wound element) containing a membrane with a molecular cut off=200 Daltons. This membrane selected to allow glucose and fructose to passage, will allow constituents that have a molecular size of less than 200 Daltons to permeate through. This modifies fraction 2 so that it contains constituents with molecular size range of 200 to 2000 Daltons. This permeate constitutes the molecular size constituents that are less than 200 Daltons, which includes the glucose and fructose (fraction 3).

Fraction 3 can be further filtered through a 150 Dalton molecular sized NF membrane (Perma spiral wound element) that will allow many of the minerals, water, volatile aromatics and fruit acids to passage as permeate, leaving fructose and glucose behind. This fraction 4 contains most of the constituents that are less than 150 Daltons in molecular size stemming from the original orange juice.

Effectively, all the fractions except the one containing the glucose and fructose can be recombined to produce a lower sugar or calorie orange juice. The natural glucose and fructose can if required be substituted with plant sweeteners such as Stevia and the like which are very low in calories yet provide sweetness.

It is preferred that the filtration be carried in series in a continuous process under inert conditions using inert gas to prevent oxidation.

Example 3

Production of Orange Mineral Water

From the above example fraction 4, which contains constituents from the original orange juice that are less than 150 Daltons in molecular size and exclude significant sugar quantities (if any) can further be processed to produce a mineral, fruit acid enriched potable drinking water suitable for bottling.

Fraction 4 can be further processed through activated carbon to remove residual taste and volatile low molecular weight aromatic compounds that are present in this fraction. The carbon specific for this purpose can be determined by laboratory testing of carbon quantity and contact time to obtain a neutral taste and aroma in the water produced.

The mineral water from raw orange juice produced can be sterilized (through 0.22 micron absolute filtration or other means) and bottled.

Example 4

Production of Orange Nutrient Water

This fraction 4 described above can also be recombined with other individual fractions either before or after activated carbon treatment. Fraction 2 with constituents of molecular size between 200 and 2000 Daltons, contains mostly vitamins, phytonutrients and the antioxidants of the orange fruit and can be added at any proportion, to the predominantly aqueous fraction 4 to make low calorie nutrient water.

This nutrient water can be sterilized i.e. Velcorin or other means and bottled for commercial sale.

The invention claimed is:
1. A method for preparing a plant derived beverage product or process intermediate, the method including the steps of:
providing a crushed or liquified extract of a plant material comprising:
(i) one or more undesirable soluble sugar component(s) within a molecular weight band having an upper limit of about 200 Da,
(ii) one or more desirable soluble nutrient component(s) having molecular weight(s) lower than the lower limit of the molecular weight band, and
(iii) one or more desirable soluble nutrient component(s) having molecular weight(s) higher than the upper limit of the molecular weight band; and
exposing the extract to a first size exclusion means so as to form a first fraction comprising one or more desirable soluble nutrient component(s) with molecular weight(s) lower than the lower limit of the molecular weight band, and a second fraction comprising one of more undesirable soluble sugar component(s) with molecular weight(s) within the molecular weight band and one or more desirable soluble nutrient component(s) having molecular weights higher that the upper limit of the molecular weight band; and
exposing the second fraction to a second size exclusion means having a molecular weight cutoff of less than about 200 Da so as to form a third fraction comprising one or more desirable soluble nutrient component(s) with molecular weight(s) higher than the upper limit of the molecular weight band, and a discard fraction having one or more undesirable soluble sugar component(s) within the molecular weight band; and
combining the first and third fractions so as to form a plant derived beverage product.
2. A method according to claim 1 wherein the desirable soluble component is selected from the group consisting of a mineral, a vitamin, water, an antioxidant, a phytonutrient, a phytochemical, and an aromatic molecule.
3. A method according to claim 1 wherein the size exclusion purification means is selected from the group consisting of nanofiltration, reverse osmosis, ultrafiltration and cross-flow filtration.
4. A method according to claim 1 wherein the size exclusion purification means is nanofiltration.
5. A method according to claim 1 wherein the molecular weight band is between about 90 Da and about 200 Da.
6. A method according to claim 1 comprising the step of exposing the product or process intermediate to an activated carbon or zeolite, or a macroporous adsorbent resin, or a functionally equivalent resin.
7. A method according to claim 1 wherein the liquefied extract of a plant material is a low sugar by-product of a plant juice concentration process.
8. A method according to claim 1 wherein the liquefied extract of a plant material is a low sugar juice filtration permeate, or a low sugar juice produced by evaporation or freezing.
9. A method for preparing a plant derived beverage product or process intermediate, the method including the steps of:

providing a crushed or liquified extract of a plant material comprising:
  (i) one or more undesirable soluble sugar component(s) within a molecular weight band having an upper limit of about 200 Da,
  (ii) one or more desirable soluble nutrient component(s) having molecular weight(s) lower than the lower limit of the molecular weight band, and
  (iii) one or more desirable soluble nutrient component(s) having molecular weight(s) higher than the upper limit of the molecular weight band; and
exposing the extract to a first size exclusion means having a molecular weight cutoff of less than about 200 Da so as to form a first fraction comprising one or more desirable soluble nutrient component(s) with molecular weight(s) higher than the upper limit of the molecular weight band, and a second fraction comprising one of more undesirable soluble sugar component(s) with molecular weight(s) within the molecular weight band and one or more desirable soluble nutrient component(s) having molecular weights lower that the lower limit of the molecular weight band; and
exposing the second fraction to a second size exclusion means so as to form a third fraction comprising one or more desirable soluble nutrient component(s) with molecular weight(s) lower than the lower limit of the molecular weight band, and a discard fraction having one or more undesirable soluble sugar component(s) within the molecular weight band; and
combining the first and third fractions so as to form a plant derived beverage product.

10. A method according to claim 9 wherein the desirable soluble component is selected from the group consisting of a mineral, a vitamin, water, an antioxidant, a phytonutrient, a phytochemical, and an aromatic molecule.

11. A method according to claim 9 wherein the size exclusion purification means is selected from the group consisting of nanofiltration, reverse osmosis, ultrafiltration and cross-flow filtration.

12. A method according to claim 9 wherein the size exclusion purification means is nanofiltration.

13. A method according to claim 9 wherein the molecular weight band is between about 90 Da and about 200 Da.

14. A method according to claim 9 comprising the step of exposing the product or process intermediate to an activated carbon or zeolite, or a macroporous adsorbent resin, or a functionally equivalent resin.

15. A method according to claim 9 wherein the liquefied extract of a plant material is a low sugar by-product of a plant juice concentration process.

16. A method according to claim 9 wherein the liquefied extract of a plant material is a low sugar juice filtration permeate, or a low sugar juice produced by evaporation or freezing.

* * * * *